United States Patent
Ouimet et al.

(10) Patent No.: US 9,919,262 B2
(45) Date of Patent: Mar. 20, 2018

(54) PROCESS FOR CAPTURING SULFUR DIOXIDE FROM A GAS STREAM

(71) Applicant: CANSOLV TECHNOLOGIES INC., Montreal, Québec (CA)

(72) Inventors: Michel Ouimet, Mirabel (CA); Mélina Infantino, Montreal (CA)

(73) Assignee: SHELL OIL COMPANY, Houston, TX (US)

( * ) Notice: Subject to any disclaimer, the term of this patent is extended or adjusted under 35 U.S.C. 154(b) by 122 days.

(21) Appl. No.: 15/034,360

(22) PCT Filed: Nov. 5, 2014

(86) PCT No.: PCT/CA2014/051059
§ 371 (c)(1),
(2) Date: May 4, 2016

(87) PCT Pub. No.: WO2015/066807
PCT Pub. Date: May 14, 2015

(65) Prior Publication Data
US 2016/0263519 A1    Sep. 15, 2016

(30) Foreign Application Priority Data
Nov. 7, 2013  (EP) ..................................... 13191903

(51) Int. Cl.
*B01D 53/14* (2006.01)
*B01D 53/50* (2006.01)

(52) U.S. Cl.
CPC ..... *B01D 53/1481* (2013.01); *B01D 53/1425* (2013.01); *B01D 53/1475* (2013.01);
(Continued)

(58) Field of Classification Search
CPC ............ B01D 53/1425; B01D 53/1475; B01D 53/1481; B01D 53/1493; B01D 2252/20;
(Continued)

(56) References Cited

U.S. PATENT DOCUMENTS 4,999,031 A * 3/1991 Gerhardt ............ B01D 53/1462
                                                   423/229
5,019,361 A    5/1991  Hakka
(Continued)

FOREIGN PATENT DOCUMENTS

CA    2534879    2/2005
CA    2748214    2/2013
(Continued)

OTHER PUBLICATIONS

Fogg, P.G.T., et al.: Solubility of Gases in Liquids, A Critical Evaluation of Gas/Liquid Systems in Theory and Practice, Chapter 5, Solubility of Sulfur Diolide, pp. 39-85, 1991.
(Continued)

*Primary Examiner* — Frank Lawrence

(57) ABSTRACT

A process for removing sulfur dioxide from a feed gas stream, which comprises (i) contacting the feed gas stream with an aqueous lean absorbing medium comprising a chemical solvent comprising a regenerable absorbent, a physical solvent, and one or more heat stable salts. The regenerable absorbent is an amine. The ratio of the wt % of the physical solvent over that of the regenerable absorbent is 0.5 to 2.5. The ratio of the wt % of heat stable salts over that of the regenerable absorbent is 0.29 to 0.37. The pH of the lean absorbing medium is 6 or less. With the process SO2 can be selectively removed. When the absorbing medium is stripped, a reduced amount of energy is required as compared to known processes.

15 Claims, 6 Drawing Sheets

(52) U.S. Cl.
CPC ...... *B01D 53/1493* (2013.01); *B01D 2252/20* (2013.01); *B01D 2252/2026* (2013.01); *B01D 2252/2041* (2013.01); *B01D 2252/20415* (2013.01); *B01D 2252/20426* (2013.01); *B01D 2252/20431* (2013.01); *B01D 2252/20436* (2013.01); *B01D 2252/20447* (2013.01); *B01D 2252/20457* (2013.01); *B01D 2252/504* (2013.01)

(58) Field of Classification Search
CPC .... B01D 2252/2026; B01D 2252/2041; B01D 2252/20415; B01D 2252/20426; B01D 2252/20431; B01D 2252/20436; B01D 2252/20447; B01D 2252/20457; B01D 2252/504
USPC .......... 95/187, 235; 423/242.1, 242.2, 242.3, 423/242.7
See application file for complete search history.

(56) References Cited

U.S. PATENT DOCUMENTS

| | | | |
|---|---|---|---|
| 7,214,358 B2 | 5/2007 | Ravary et al. | |
| 7,309,382 B2 | 12/2007 | Cadours et al. | |
| 8,858,828 B2 * | 10/2014 | Klein | B01D 53/1462 252/184 |
| 2004/0253159 A1 * | 12/2004 | Hakka | B01D 53/1475 423/228 |
| 2006/0104877 A1 | 5/2006 | Renaud et al. | |
| 2009/0263302 A1 | 12/2009 | Hu | |
| 2013/0039829 A1 | 2/2013 | Ouimet | |
| 2013/0193375 A1 * | 8/2013 | Bhambhani Godhwani | B01D 53/1425 252/190 |
| 2013/0309155 A1 * | 11/2013 | Parisi | B01D 53/1425 423/229 |
| 2014/0260979 A1 * | 9/2014 | Infantino | B01D 3/343 95/179 |

FOREIGN PATENT DOCUMENTS

| | | |
|---|---|---|
| EP | 0368422 | 5/1990 |
| FR | 2900843 | 11/2007 |
| IN | 2006DE2381 | 5/2008 |

OTHER PUBLICATIONS

PCT International Search Report, Application No. PCT/CA2014/051059 dated Nov. 5, 2014.

\* cited by examiner

PROCESS FOR CAPTURING SULFUR DIOXIDE FROM A GAS STREAM

PRIORITY CLAIM

The present application is a National Stage (§ 371) application of PCT/CA2014/051059, filed Nov. 5, 2014, which claims priority from European Patent Application 13191903.7 filed Nov. 7, 2013, each of which are hereby incorporated by reference in their entirety.

FIELD

The present invention relates to a process for capturing sulfur dioxide ($SO_2$) from a feed gas stream. The present invention especially relates to a process suitable to selectively capture sulfur dioxide ($SO_2$) from a feed gas stream, more especially to remove $SO_2$ from a gas stream while not at the same time removing $CO_2$ from the gas stream.

BACKGROUND

It is known that $SO_2$ is more soluble in water than many other components of feed gas streams. For example, measured at 1.013 bar 0° C., the solubility of $SO_2$ in water is 228 g/L whereas the solubility of carbon dioxide and hydrogen sulfide in water is 3.369 g/L and 7.100 g/L, respectively.

The solubility of $SO_2$ in many other pure solvents has also been widely studied. See, for example, Fogg and Gerrard, 1991 (Solubility of Gases in Liquids, John Wiley and Sons, Chichester, U.K.) for a summary of the literature solubility data of $SO_2$.

Regenerable absorbents can be used to remove $SO_2$ from feed gas streams. Typically, a lean aqueous medium comprising the absorbent is exposed to a $SO_2$ containing feed gas stream, and then $SO_2$ is absorbed by the medium producing a $SO_2$ lean gas stream and a spent absorbing medium. Removal (recovery) of the absorbed SO2 from the spent absorbing medium to regenerate the aqueous medium and to provide gaseous $SO_2$ is typically effected by gaseous stripping using steam generated in situ.

Amine-based absorbents can be used for $SO_2$ removal. See, for example, U.S. Pat. No. 5,019,361 which discloses the use of an aqueous absorbing medium containing a water-soluble half salt of a diamine. U.S. Pat. No. 7,214,358 discloses the use of an aqueous absorbing medium containing a water-soluble half salt of a diamine and an elevated level of heat stable salts (HSS). Physical solvents can also be used as $SO_2$ absorbents.

Commercially available steam-regenerable SO2 capture technologies include those that rely on chemical solvents or physical solvents, such as Cansolv DS™ (amine-based absorbent-containing chemical solvent), Labsorb™ (inorganic absorbent-containing chemical solvent), ClausMaster™ (non-aqueous physical solvent), and Sea water process (chemical solvent).

Use of a combination of solvents has also been disclosed.

Indian Patent Application No. 2381/DEL/2006 describes a process for the removal of $SO_2$ using a solvent blend comprising chemical and physical solvents.

US20130039829 describes a process for the capture of sulfur dioxide from a gaseous stream utilizing a regenerable diamine absorbent comprising a diamine and a weak organic acid, such as formic acid.

The energy required for regenerating absorbing medium in a $SO_2$ removal process, in particular the energy required for stripping absorbed $SO_2$ from absorbing medium, accounts for a significant portion of the operating cost of $SO_2$ removal from a feed gas. For example, the net present value of the existing $SO_2$ capture technologies is strongly dependent on steam cost. Therefore, there remains a need to reduce regeneration energy consumption in processes for removing $SO_2$ from a gas stream.

DESCRIPTION

The invention relates to a process for removing sulfur dioxide from a feed gas stream, which process comprises:
(i) contacting the feed gas stream with an aqueous lean absorbing medium to absorb sulfur dioxide and to form a sulfur dioxide lean treated gas stream and a spent absorbing medium;
wherein the aqueous lean absorbing medium comprises:
  (a) a chemical solvent comprising a regenerable absorbent,
  (b) a physical solvent, and
  (c) one or more heat stable salts;
wherein the regenerable absorbent is an amine, preferably a mono amine, a diamine, a polyamine, or a mixture thereof, most preferably a diamine;
wherein the ratio of the weight percentage of the physical solvent in the lean absorbing medium over that of the regenerable absorbent is in the range of from 0.5 to 2.5, preferably from 1.1 to 2.2;
wherein the ratio of the weight percentage of heat stable salts in the lean absorbing medium over that of the regenerable absorbent is in the range of from 0.29 to 0.37, preferably from 0.31 to 0.34; and
wherein the pH of the lean absorbing medium is 6 or less, preferably 5.6 or less, more preferably in the range of from 4.5 to 5.6, even more preferably in the range of from 5.2 to 5.6.

With the process of the current invention SO2 can be removed selectively, that is, SO2 is removed from gas. CO2 and other components are not or hardly removed from the gas. Furthermore, during step (i) the absorbing medium is present in a single liquid phase. No liquid-liquid phase separation takes place.

The process preferably comprises the following additional steps:
(ii) stripping, preferably steam stripping, absorbed sulfur dioxide from the spent absorbing medium to produce a regenerated aqueous absorbing medium and a gaseous sulfur dioxide;
and optionally
(iii) recycling the regenerated aqueous absorbing medium from step (ii) to step (i).

During step (ii) the absorbing medium is present in a single liquid phase. No liquid-liquid phase separation takes place.

In some embodiments, the absorbing medium comprises at least 14 wt % of the physical solvent. The absorbing medium may comprise up to 35 wt % of the physical solvent.

In some embodiments, the sulfur dioxide amine absorbent is a mixture of 4-[hydroxyethyl]piperazine (Hep) and 1,4-bis[hydroxyethyl]piperazine (DiHep). In some embodiments, the lean absorbing medium may be an aqueous medium comprising 18 wt % of a mixture of Hep and DiHep, 1.2 eq./mole HSS and 14 wt % PEGDME. In some embodiments, the lean absorbing medium may be an aqueous medium comprising 13 wt % of a mixture of Hep and DiHep, 1.2 eq./mole HSS and 17 wt % PEGDME.

In some embodiments, the sulfur dioxide amine absorbent is 2-piperazinone 1,4-bis[2-hydroxyethyl] (Amide-DiHep).

In some embodiments, the lean absorbing medium may be an aqueous medium comprising 25 wt % Amide-DiHep, 0.35 eq./mole HSS and 20 wt % PEGDME.

In some embodiments, the sulfur dioxide amine absorbent is 3-aminopyrazole. In some embodiments, the lean absorbing medium may be an aqueous medium comprising 22 wt % 3-aminopyrazole, 0.1 eq./mole HSS and 32 wt % PEGDME.

In some embodiments, the step of stripping absorbed sulfur dioxide may use steam. With the current invention it proved to be possible to use less steam during stripping than in a corresponding step in a process that does not use a physical solvent. This results in a significant energy reduction.

In some embodiments, the processes as described herein may further comprise a step of removing heat stable salts from the regenerated aqueous absorbing medium before recycling the regenerated aqueous absorbing medium. The step of removing heat stable salts may comprise using a weak base anion resin, ion pairing, crystallization or precipitation.

In some embodiments, the processes as described herein further comprise a step of recovering the gaseous sulfur dioxide.

With the process of the invention a pure SO2 stream can be obtained that can be used for sulfuric acid make, or for use in a sulfur reduction unit in a Claus application. The pure SO2 stream is not or hardly contaminated with CO2 or mercaptans which would contaminate sulfuric acid, or which would contaminate a Claus unit.

DRAWINGS

SO2 Removal

Figure 1:
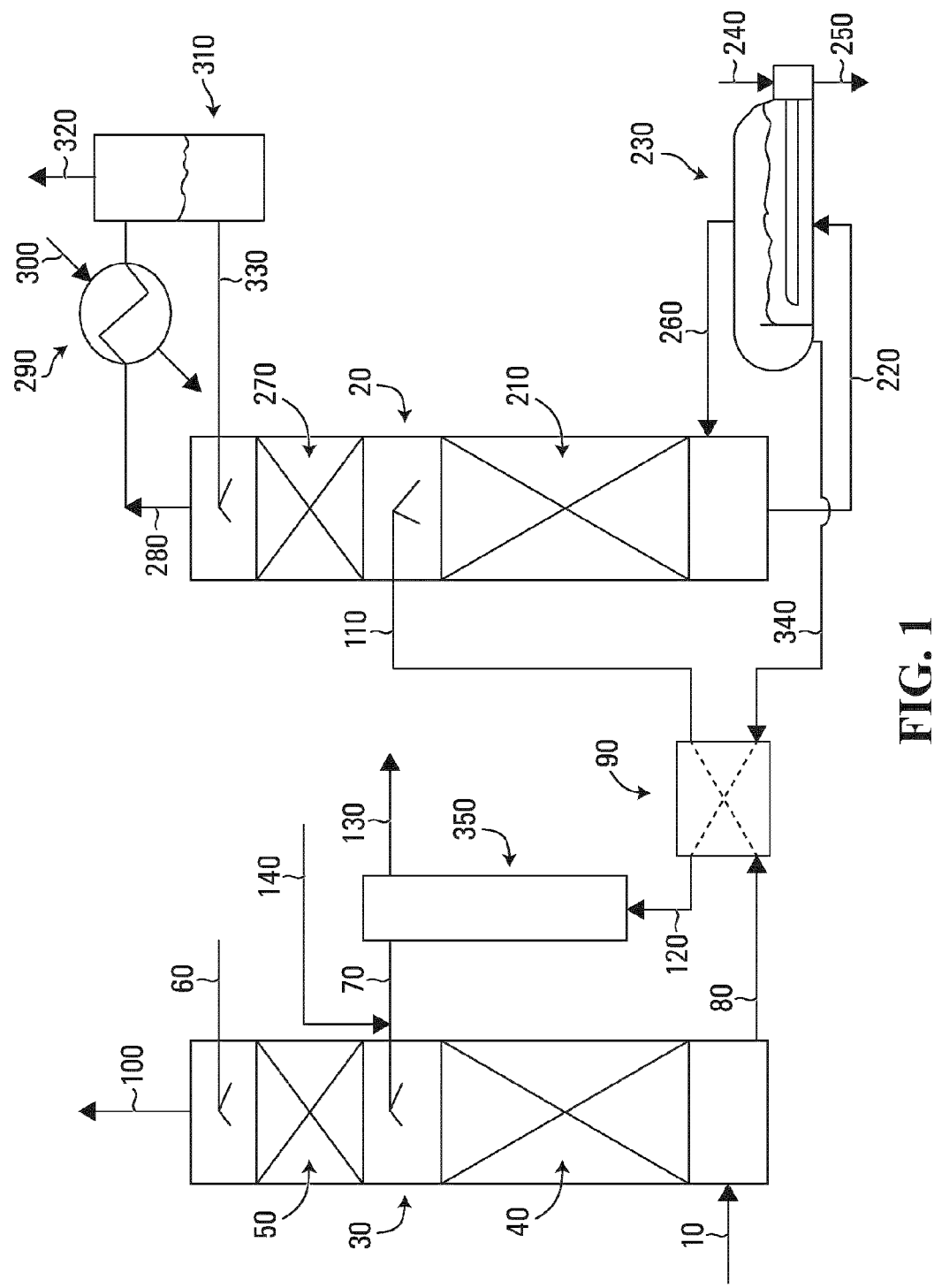
FIG. 1 shows a flow diagram of a regenerative $SO_2$ removal process according to one invention embodiment.

In general, a suitable indicator for an appropriate choice of absorbent (e.g., a chemical solvent) for use in the capture of a given gaseous acid gas contaminant (such as $SO_2$) in a feed gas is the difference in the $pK_a$ values between the acid gas in water and the absorbent.

The $pK_a$ of an acid is defined as the negative logarithm to the base 10 of the equilibrium constant $K_a$ for the ionization of the acid HA (e.g., $H_2SO_3$), where H is hydrogen and A is a radical capable of being an anion:

$$HA \leftrightarrows H^+ + A^- \quad (1)$$

$$K_a = [H^+][A^-]/[HA] \quad (2)$$

$$pK_a = -\log 10 K_a \quad (3)$$

For a basic absorbent B, the $pK_a$ is for the ionization reaction of the conjugate protonated acid of B, the species $BH^+$:

$$BH^+ \leftrightarrows B + H^+ \quad (4)$$

The reaction involved in the absorption of the acid gas contaminant HA by the basic absorbent B can be shown as follows:

$$HA + B \rightarrow BH^+ + A^- \quad (5)$$

Reaction (5) is reversible:

$$BH^+ + A^- \rightarrow HA + B \quad (6)$$

When $SO_2$ is dissolved in water, following reaction (1), bisulphite ions ($HSO_3^-$) and protons are formed. The proton may be ionically associated with the absorbent (for example, when an amine-based absorbent is used, the proton may be ionically associated with the sorbing nitrogen of the absorbent). The absorbed $SO_2$/desorbed $SO_2$ equilibrium is illustrated in the above reaction (6). Absorbed $SO_2$ can be "stripped" from the spent absorbing medium as gaseous $SO_2$, for example and without limitation, by the application of steam. In this stripping process, desorbed SO2 is released from the spent absorbing medium. "Stripping" is used herein to broadly encompass removal of absorbed $SO_2$ from the spent absorbing medium, and should be understood as also, more specifically, encompassing releasing desorbed SO2 from the spent absorbing medium.

It has been found that contacting a feed gas stream with a lean absorbing medium comprising a chemical solvent and a physical solvent may reduce the energy consumption for stripping absorbed SO2 from spent absorbing medium, or may reduce the energy consumption for releasing desorbed $SO_2$ from spent absorbing medium, thereby reducing regeneration energy consumption in a process for removing $SO_2$ from the gas stream. The reduction of regeneration energy consumption achieved by the methods of the invention is understood to be relative to a method that does not use a physical solvent.

As used herein, regeneration energy relates to the amount of energy required to regenerate an absorbing medium used to absorb $SO_2$ in a process for removing $SO_2$ from a feed gas stream. The absorbing medium, according to the invention, comprises a chemical solvent and a physical solvent.

Stripping

Preferably step (ii) is performed in a reboiler. More preferably step (ii) is performed in a kettle reboiler, forced circulation reboiler, fired reboiler, falling film reboiler, direct steam reboiler, or thermosyphon, most preferably in a thermosyphon.

The reboiler may be heated by hot oil, electricity or steam, preferably steam. Alternatively, direct steam addition can be utilized.

Preferably at least 97 vol %, more preferably at least 99 vol %, even more preferably at least 99.9 vol % of the spent absorbing medium formed in step (i) is stripped, preferably steam stripped, in step (ii).

Chemical Solvent

Chemical solvents for use in the invention comprise a regenerable absorbent that selectively absorbs SO2. In some embodiments, the chemical solvent comprises an aqueous medium and the absorbent.

In general, a suitable chemical solvent may have one or more of the following properties: high capacity for the absorption of $SO_2$; ready and substantially complete release of absorbed $SO_2$; little tendency to cause oxidation of $SO_2$; low heat of absorption; high boiling point; low specific heat; and high stability at temperatures required for the release of $SO_2$.

The chemical solvent is or comprises an amine. The amine may be a mono amine, a diamine, a polyamine, or a mixture thereof. Suitable amines include, but are not limited to, 1,4-bis[hydroxyethyl]piperazine, 4-[hydroxyethyl]piperazine, 1,4-diazabicyclo[2.2.2]octane (DABCO), 2-[2-aminoethyl]pyridine, 2-aminomethylpyridine, 3-amino 5-methylpyrazole, 3-aminopyrazole, 3-methylpyrazole, N,N,N',N'-tetraethyldiethylenetriamine, N,N,N',N'-tetramethyldiethylenetriamine, 2-piperazinone 1,4-bis[2-hydroxyethyl], or a combination thereof.

The amine-based absorbent may be a diamine represented by the structural formula:

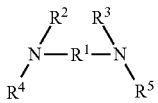

wherein $R^1$ is an alkylene of two or three carbon atoms as a straight chain or as a branched chain, $R^2$, $R^3$, $R^4$, and R5 may be the same or different and can be hydrogen, alkyl (e.g., lower alkyl of 1 to 8 carbon atoms including cycloalkyls), hydroxyalkyl (e.g., lower hydroxy alkyl of 2 to 8 carbon atoms), aralkyl (e.g., 7 to 20 carbon atoms), aryl (may be, for example, monocyclic or bicyclic), or alkaryl (e.g., 7 to 20 carbon atoms), and any of $R^2$, $R^3$, $R^4$, and $R^5$ may form cyclic structures.

The diamines may also be tertiary diamines. For instance, the tertiary diamine may be of the formula:

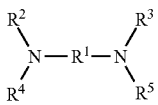

wherein $R^1$ is as defined above, and $R^2$, $R^3$, $R^4$, and $R^5$ are as defined above with the exception that none are hydrogen. In an exemplary embodiment, each of $R^2$, $R^3$, $R^4$, and $R^5$ is the same or different and is an alkyl group (e.g., methyl or ethyl) or a hydroxy-alkyl group (e.g., 2-hydroxyethyl).

Other diamines in which one or both of the nitrogen atoms is primary or secondary and which otherwise meet the parameters discussed herein may also be suitable, provided mild oxidative or thermal conditions exist to minimize side reactions of the solvent, including oxidation.

Suitable diamines, according to some invention embodiments, have one amine with a lower $pK_a$ and the other amine with a higher pKa wherein the higher $pK_a$ is above 6.5 and, in some instances, above 7.5 and the lower pKa is less than 5.0 and, in some instances, less than 4.0. The stronger amine (the one with the higher $pK_a$) may react to form heat stable salts (HSS). For instance, the stronger amine may react with a strong acid (e.g., sulfuric acid) to obtain a HSS. In some embodiments, the lean amine-based absorbent, which is exposed to the gas stream, is therefore in its half-salt form. Accordingly, only the weaker, more moderate amine is available for reacting with the feed gas stream and releasably absorbing $SO_2$.

In some embodiments, the diamine in half salt form has a $pK_a$ value for the free nitrogen atom of 3.0 to 5.5 and, in some instances, 3.5 to 4.7 at a temperature of 20° C. in an aqueous medium. The free amine form of the amine salt absorbent may have a molecular weight less than 300 g/mol and, in some instances, less than 250 g/mol.

In some embodiments, the amine salt absorbents have a hydroxyalkyl group as a substituent on an amine group. Without being limited by theory, it is believed that a hydroxy substituent may increase the solubility of the amine salt absorbents in water. Without being limited by theory, it is further believed that a hydroxy substituent may retard the oxidation of sulphite or bisulphite to sulfate, which can result in the formation of HSS. As discussed below, it may be desirable to minimize the formation of HSS.

Suitable diamine compounds may include, but are not limited to, N,N'N'-(trimethyl)-N-(2-hydroxyethyl)-ethylenediamine ($pK_a$=5.7); N,N,N',N'-tetrakis(2-hydroxyethyl)ethylenediamine ($pK_a$=4.9); N,N'-dimethylpiperazine ($pK_a$=4.8); N,N,N',N'-tetrakis(2-hydroxyethyl)-1,3-diaminopropane; and N',N'-dimethyl-N,N-bis(2-hydroxyethyl)ethylenediamine. Useful diamines may also comprise, in some embodiments, heterocyclic compounds, such as piperazine ($pK_a$=5.8), N-(2-hydroxyethyl)piperazine, N,N'-di(2-hydroxyethyl)piperazine and 1,4-diazabicyclo[2.2.2]octane ($pK_a$=4.9). The $pK_a$ values identified in the brackets are for the weaker, sorbing nitrogen.

According to some embodiments of the invention, the diamine may be selected from the group comprising hydroxyethyl piperazine, bis-hydroxyethyl piperazine, piperazine, hydroxyethylethylenediamine, bis-hydroxyethylethylenediamine and mixtures thereof. For example, the diamine may comprise 1,4-bis[hydroxyethyl]piperazine, 4-[hydroxyethyl]piperazine, or a combination thereof.

Without being limited by theory, it is believed that use of amine-based absorbents that generate HSS at a controllable low level may permit an increase in the concentration of the physical solvent in absorbing medium of the present invention, and maintain a one-phase solution of the absorbing medium. One example of such an amine is 2-piperazinone 1,4-bis(2-hydroxyethyl) (Amide-DiHep).

It will be appreciated that, in some embodiments, one or more amines may be used as the absorbent and one or more amines may be used with other heat regenerable sulfur dioxide absorbents.

The amine-based absorbent may be in an amount sufficient to provide a spent absorbing medium containing at least 180 grams of $SO_2$ per kilogram of absorbing medium. The amount of amine-based absorbent, however, may not be so great as to either (a) unduly increase the viscosity of the absorbing medium such that undesirable pressure drops are incurred in the feed gas stream passing through an absorber vessel or (b) render the absorbing medium difficult to atomize in, for example, a Waterloo scrubber.

In some other embodiments, the chemical solvent may comprise an organic acid. The organic acid may have a pKa such that, at the pH of the lean aqueous medium, the organic acid is substantially in its basic form and, at the pH of the spent absorbent medium, the organic acid is substantially in its acidic form. For example, if the organic acid is formic acid, then at the pH of lean absorbent stream, the formic acid is present as formate and, at the pH of the spent absorbing medium (SO2 rich absorbent stream), the organic acid is substantially in the form of formic acid. By substantially, it is meant that at least 30% or, in some instances, at least 50%, of the organic acid is in the particular form at the specified pH.

The organic acid may have a $pK_a$ of 1.2-6 and, in some instances, 3.5-5.5.

The organic acid may comprise one or more of formic acid, acetic acid, glycolic acid, malonic acid, propanoic acid, succinic acid, phthalic acid, citric acid, adipic acid, tartaric acid, malic acid, and oxalic acid. In some embodiments, the organic acid comprises one or more of formic acid, acetic acid, malonic acid, malic acid, tartaric acid, citric acid, and adipic acid.

The chemical solvent may comprise a mixture of amine based absorbent and organic acid as described above.

Physical Solvent

Physical solvents for use in the invention may have one or more of the following characteristics: low volatility; water solubility; and low heat capacity.

The physical solvent may have a vapour pressure less than 0.1 mmHg at 20° C. with a boiling point equal to or higher than 240° C.

Suitable physical solvents include, but are not limited to, a polyol, a polycarbonate, an N-formyl morpholine, or a combination thereof. The polyol may be a polyethylene glycol or an ether thereof, for instance, of the formula $R^6$—O—$(C_2H_4O)$n-$R^7$, wherein n is 3 to 12, $R^6$ is hydrogen or lower alkyl (e.g., $C_{1-8}$ alkyl), $R^7$ is hydrogen or lower alkyl (e.g., $C_{1-8}$ alkyl), or R6 is $C_{6-10}$ aryl (e.g., phenyl) and $R^7$ is hydrogen or lower alkyl (e.g., $C_{1-8}$ alkyl). For example, the physical solvent may be polyethyleneglycol dimethylether (PEGDME), tetraethyleneglycol dimethylether (TetraEGDME), triethyleneglycol monomethylether (TriEGMME), tetraethylene glycol (TetraEG), or a combination thereof.

The miscibility of some physical solvents such as PEGDME in the absorbing medium may be affected by the concentration of the regenerable absorbent and/or the amount of HSS. For example, the miscibility of PEGDME in an aqueous diamine solution decreases as the concentration of diamine increases and as the amount of HSS increases. In some embodiments, it may be desirable to lower the concentration of the regenerable absorbent and/or the amount of HSS in order to increase the amount of miscible physical solvents in the absorbing medium.

When the physical solvent is PEGDME, without being limited by theory, it is believed that reduction of the amount of HSS and increase of the concentration of PEGDME may reduce hydrogen bonding and/or increase ether-sulfur bridges in the absorbing medium, which renders the absorbing medium more aprotic and potentially reduces the energy consumption for stripping absorbed $SO_2$.

Without being limited by theory, it is believed that physical solvents may reduce the energy consumption required for releasing desorbed $SO_2$. Physical solvents may compete with other components of spent absorbing medium to attract SO2. Physical solvents may further reduce hydrogen bonding between $SO_2$ and spent absorbing medium. Physical solvents may also reduce the polarity of $SO_2$ in spent absorbent medium or make the medium more aprotic. Physical solvents may even further change the surface tension of spent absorbent medium.

Heat Stable Salts (HSS)

HSS may accumulate in the medium due to, for example, sulfite/bisulfite oxidation or disproportionation, or due to the absorption of acid mist from the feed gas. These salts are too stable to decompose under normal steam conditions for stripping $SO_2$ from spent absorbing medium. Examples of such heat stable salts are those salts that are formed from strong acids such as sulfuric acid, nitric acid, or hydrochloric acid. If allowed to accumulate, these heat stable salts would eventually completely neutralize the $SO_2$ absorption capacity of the absorbent. Therefore, management of HSS in the solution may be an important part of the $SO_2$ removal process to maintain performance over time.

The amount of HSS formed may be affected by the absorbent used and/or the concentration of the absorbent. The amount of HSS for an absorbing medium may be controlled by using conventional means, such as an ion exchange resin, eletrodialysis unit or crystallization. Amine purification units (APU) that are currently used industrially utilize weak anionic resins capable of some selectivity between sulfate (a strong conjugated base) and weaker conjugated bases in the absorbing medium. The performance of such weak base resins varies depending on the concentration of sulfate in solution. These resins do not always perform well if there is a low concentration of HSS.

Ways to control the level of HSS for an organic acid/physical solvent mixture may also include ion exchange with cyclo[8]pyrrole as the functional groups or by crystallization of alkaline sulfate salts (e.g. $Na_2SO_4$), where the cation can be sodium or potassium, most often sodium. Another way of controlling the level of HSS in the organic acid/physical solvent mixture is precipitation of Ettringite $(Ca_6Al_2(SO_4)_2(OH)_{12}.26H_2O)$.

In the alternative, HSS could also be removed by ion pairing. Without being limited by theory, it is believed that a low HSS amount in the absorbing medium, in accordance with some embodiments of the invention, may reduce the efficiency of the exchange of HSS with a standard anionic weak base resin. In some embodiments, it may therefore be desirable to remove HSS by ion pairing, which may permit a higher rate of removal of HSS even when the amount of salts in solution is low. Ion pairing may be achieved, for example, by using a dual function resin having different ionic functional groups (such as a combination of phenol and quaternary amine functional groups) or by liquid-liquid extraction.

Without being limited to theory, it is believed that a strong base quaternary amine functional group insensitive to suppressed salt concentrations will attract opposite charged anions regardless of their type. During regeneration, the phenolic functional group which is the active exchange site in the above described dual function resin, becomes negatively charged at a pH greater than 10.5, and repels the like charged anions.

The Absorbing Medium

The absorbing medium comprises the physical solvent and the chemical solvent. The absorbing medium is a one phase solution during step (i) and during step (ii). It is aqueous.

The pH of the lean absorbing medium is 6 or less, preferably 5.6 or less, more preferably in the range of from 4.5 to 5.6. Even more preferably the pH of the lean absorbing medium before contacting the feed gas is controlled in the range from 5.2 to 5.6.

The absorbing medium may contain at least one mole of water and usually more for each mole of $SO_2$ to be removed from the gas stream. The water acts both as a solvent for the amine salt and as for a reactant to produce "sulfurous acid" $H_2SO_3$ from the $SO_2$. The proportion of water present may be up to 95 weight percent of the absorbing medium and, in some instances, 60 to 90 weight percent of the absorbing medium.

The lean absorbing medium may comprise an organic acid and/or an anorganic acid, preferably an anorganic acid, more preferably one or more acids chosen from the group of nitric acid ($HNO_3$), hydrochloric acid (HCl), sulfuric acid ($H_2SO_4$) and sulfurous acid ($H_2SO_3$), even more preferably sulfuric acid ($H_2SO_4$) and/or sulfurous acid ($H_2SO_3$).

The viscosity of the absorbing medium may be below 1200 centipoise at 25° C., e.g., between 1 and 500 centipoise, and more specifically between 1 and 50 centipoise, at 25° C. Frequently, the solubility of the amine salt absorbent in water may be at least 0.01, often at least 0.1, mole per liter at 25° C. In some embodiments, the amine salt absorbent is miscible with water under the conditions in the process. However, the amine salt absorbent and water does not have to be miscible under the conditions of the process, nor does the amine salt absorbent have to be liquid under the conditions of the process.

In some embodiments, anti-foam agents known in the art may be used to reduce the foaming tendency of the mixture of the chemical solvent and the physical solvent. Anti-foam agents and amounts can be chosen and optimized in accordance with known practices. It may be desirable to choose an anti-foam agent compatible with the system chosen for HSS removal (e.g., compatible with an anionic resin used in a commercial installation).

Regeneration Energy Consumption

The methods of the present invention may reduce the regeneration energy consumption by 10% or more. In some embodiments, the regeneration energy consumption may be reduced by 15% or more, or even 20% or more.

It has been observed that the level of regeneration energy saving may vary over the concentration of the physical solvent or the ratio of the physical solvent over the regenerable absorbent. The ratio of the weight percentage of the physical solvent in the absorbing medium over that of the regenerable absorbent may be from 0.5 to 2.5. In some embodiments, the ratio may be from 1.1 to 2.2.

Without being limited by theory, it is believed that increasing the concentration of the physical solvent in the absorbing medium may decrease the level of regenerative energy required.

In some embodiments, it may be desirable that the absorbing medium comprises at least 14 wt % of the physical solvent. The physical solvent may be present in the absorbing medium up to 35 wt %.

The amount of heat stable salts (HSS) may also affect the level of regeneration energy saving as it affects the solubility of the physical solvent in the absorbing medium. The presence of HSS may reduce the miscibility of the physical solvent in the absorbing medium. In some embodiments, it may be desirable that the absorbing medium comprises less than 0.4 equivalent/amine mole of HSS.

The ratio of the weight percentage of heat stable salts in the lean absorbing medium over that of the regenerable absorbent is in the range of from 0.29 to 0.37, preferably from 0.31 to 0.34.

$SO_2$ Removal Processes

The process of the invention is selective for $SO_2$ removal over other gases, such as $CO_2$, $NO_x$, etc. A process flow diagram for an exemplary embodiment of a process to remove or capture $SO_2$ is shown in FIG. 1.

FIG. 1 exemplifies a heat regenerable absorbent cycle. In general, a lean absorbent medium is exposed to a $SO_2$ containing feed gas stream whereby $SO_2$ is absorbed into the absorbent and removed from the feed gas stream. The $SO_2$ rich absorbent formed after $SO_2$ absorption is then regenerated by heat, such as in a steam-stripping column. The regenerated lean absorbent may then be cycled back to absorb more $SO_2$.

Referring to FIG. 1, a $SO_2$ containing feed gas stream 10 is treated to obtain a $SO_2$ rich absorbent stream 80 (the spent absorbent stream). The feed gas stream 10 may be any stream, which contains $SO_2$ at levels suitable for SO2 removal before the gas is released to the atmosphere, such as, without limitation, flue gas from a fluid catalytic cracker unit, an acid plant tail gas, a coal fired power plant off-gas or the like.

$SO_2$ rich absorbent stream 80 is obtained by contacting feed gas stream 10 with any of the $SO_2$ absorbents taught herein and known in the art. The absorbent may be contacted with feed gas stream 10 using any means known in the art. As exemplified in FIG. 1, feed gas stream 10 flows into a gas-liquid contact apparatus 30, where intimate contact between feed gas stream 10 and lean absorbent stream 70 occurs. Apparatus 30 may be any gas-liquid contactor or absorption tower known in the art, such as a spray or packed tower. Illustrative contacting devices include, without limitation, countercurrent absorption columns including packed columns and tray columns; countercurrent or co-current spray columns including Waterloo scrubbers and venturi scrubbers; thin film contactors; and semipermeable membranes. FIG. 1 illustrates a counter current flow packed tower, wherein liquid gas contact is promoted by suitable random or structured packing 40 in the column. $SO_2$ is absorbed into the lean absorbent stream 70, producing rich $SO_2$ containing absorbent, which exits from the apparatus 30 as $SO_2$ rich absorbent stream 80.

The amount of absorbing medium employed per unit volume of gas and the contact time may be sufficient for effective removal of substantially all the $SO_2$ from the gas stream, or to leave a desired residual amount, e.g., less than 500 ppmv, or even less than 200 ppmv, or even less than 50 ppmv, $SO_2$. The process may be applicable to any SO2 containing gas stream, e.g., up to 20 or 50 volume percent $SO_2$, including for application to flue gas streams from thermal generating plants, which contain 700 to 5000 ppmv $SO_2$, typically 1000 to 3000 ppmv $SO_2$.

In some embodiments, the feed gas stream 10 is saturated (e.g., 90 percent saturation or more) with water, which may prevent undue dehydration of the absorbing medium. In some embodiments, however, a relatively water-unsaturated gas may be contacted with the absorbing medium in order to save capital investment or minimize the space required.

In some embodiments, the feed gas 10 may be relatively free of particulates such as fly ash, which may minimize fouling of the gas-liquid contact equipment or provide materials that might catalyze the disproportionation reaction or the oxidation of sulphite or bisulphite.

The contact of the absorbing medium with the $SO_2$ containing gas stream may be effected within the temperature range from the freezing point of the absorbent up to 75° C., or from 10° C. to 60° C., or from 10° C. to 50° C.

In some embodiments, it may be desirable to optimize process conditions to provide a loading of $SO_2$ of at least 35 grams of sulfur dioxide per kilogram of absorbing medium, e.g., 50 grams to 150 grams or up to 300 grams.

The pH of the lean absorbent medium at the point of contact with feed gas stream 10 may be in the range of 4.5 to 6.5, e.g. 5 to 6.5 or 5 to 6. The pH of the absorbent at the end of the contacting stage (e.g., at the bottom of the absorption column) may be in the range of 3 to 5, e.g., 4 to 5.

Accordingly, the pH of the absorbing medium during the absorption process may vary from 6.5-3.0, e.g., 6.5-3.5 or 6.0-4.0. Usually the lean absorbing medium (lean absorbent stream 70) initially has a pH close to the upper end of this range, while the pH of the $SO_2$ rich absorbent ($SO_2$ rich absorbent stream 80) is on the lower end and may be determined by the absorption conditions, such as the partial pressure of $SO_2$ in the feed gas and the absorption temperature. Thus, as $SO_2$ is absorbed and the solution tends to become more acidic, the pH moves towards the lower end of the range.

In order to enhance the removal of sulfur dioxide and facilitate regeneration of the absorbent, a low temperature for the absorption, to enable significant absorption of $SO_2$, may be employed. For example, as the absorption temperature is increased, the amount of $SO_2$ absorbed per mole equivalent of sorbing nitrogen of an amine-based absorbent is decreased. In some embodiments, the sorbing amines used are relatively weak bases ($pK_a$ values of between 3.0 and 5.5), which may be regenerated with less energy consumption and at a lower temperature than, for example, stronger bases.

The time of contact between the gas and absorbing medium will depend upon the intimacy of contact between the phases and the rate of transfer of the SO2 into the liquid phase. For spray-type scrubbers, the contact time may be less than 1 or 2 seconds. With absorption columns, the contact time may be 30 seconds or more. The pressure may vary widely, e.g., from sub-atmospheric to super-atmospheric pressures. Since higher pressures increase the partial pressure of a given concentration of SO2, they may be favored from a thermodynamic standpoint. However, in many instances the gas to be treated is at a pressure slightly higher or lower than the ambient pressure and raising the pressure may be economically undesirable.

The feed gas stream 10, which is reduced in SO2, may be optionally washed with, for example, water (stream 60), such as in another packed section 50, to remove absorbent that may have splashed or volatilized into the treated gas stream traveling upwardly through apparatus 30. The gas then leaves the apparatus 30 as treated feed gas stream 100 for, for example, release into the atmosphere or for further treatment or use.

The water balance in the overall process may be maintained by adding water, for example via stream 60, or withdrawing water from the process, such as by directing all or a part of stream 330 to waste.

In order to conserve energy, heated streams may be used to preheat cooler streams that are subsequently fed to the process equipment. For example, as exemplified in FIG. 1, $SO_2$ rich absorbent stream 80 flows through an indirect cross flow heat exchanger 90, where it is indirectly heated by stream 340 (a heated lean stream from regeneration tower 20 which is recycled to apparatus 30). Stream 80 is then introduced into regeneration tower 20 as stream 110.

In FIG. 1, heated $SO_2$ rich absorbent stream 110 is then treated at a temperature, which may be higher than the absorption temperature in apparatus 30, to regenerate the absorbent. The absorbent may be heated by any means known in the art. In some embodiments, the absorbent is reheated by means of steam. In such a case, regeneration tower 20 may be a steam-stripping tower. However, other sources of heat such as hot gas, heat transfer liquids and/or direct firing may be used. As exemplified in FIG. 1, $SO_2$ in downwardly moving heated $SO_2$ rich absorbent stream 110 is removed by upwardly moving stripping gas or steam to produce a $SO_2$ rich product stream 280 and a regenerated absorbent (heated lean absorbent stream 220). Inert gas stripping may also be practiced for stripping the $SO_2$ from heated $SO_2$ rich absorbent stream 110 in tower 20.

Regeneration tower 20 may be any conventional towers, for instance, having a packed or trayed design. A packed tower with a packing section 210 is shown in FIG. 1 below the $SO_2$ rich absorbent feed level (stream 110). The $SO_2$ rich absorbent is stripped of $SO_2$ as it flows downward in the tower and into optional reboiler 230. Reboiler 230 is heated by any means known in the art. In some embodiments, reboiler 230 is indirectly heated by stream 240 (which may be steam and may be obtained from any source) through, for example, a heat transfer tube bundle, producing a steam condensate stream 250 which may be recycled to produce additional steam or used elsewhere in the plant. In some embodiments, reboiler 230 is a thermosyphon type reboiler. The boiling of an aqueous liquid (e.g., $SO_2$ lean absorbent) in reboiler 230 can produce a flow of steam 260 for introduction into the regeneration tower 20. The steam ascends through the tower, heating the downward flowing $SO_2$ rich absorbent and carrying upwards the $SO_2$ stripped from the $SO_2$ rich absorbent. The steam and gaseous mixture exits the tower as product stream 280.

The desorption (regeneration) process may be conducted under any temperature and pressure conditions known in the art. In some embodiments, it may be desirable to maintain a differential in temperature between the absorption and desorption steps of at least 30° C., and the desorption temperature may be less than 110° C., e.g., 50° C. to 110° C., to provide a driving force for the desorption.

Desorption may be effected by gaseous stripping using steam generated in situ (e.g., steam 260) or by passing an inert gas or steam introducted into the system (not shown) through the spent absorbing medium, usually at near atmospheric pressure. Lower pressures somewhat favor desorption. The amount of stripping gas may vary from 0 to 100 liters per liter of absorbing medium.

The delta loading ratio of SO2 at a $SO_2$ partial pressure $ppgSO_2$=0.01 bar may be 20 $gSO_2$/L absorbent to 90 $gSO_2$/L absorbent. The delta loading ratio is the amount of $SO_2$ gas which is releasably absorbed per unit of spent absorbent medium less the amount of $SO_2$ gas which is releasably absorbed per unit of regenerated absorbent medium.

During stripping, the pH of the solution usually rises as the acidic $SO_2$ is removed. The conditions maintained during the stripping operation may be selected to achieve the desired level of regeneration of the absorbent (e.g. the level of dissolved $SO_2$ left in the absorbent).

Product stream 280 may be treated to remove excess water vapor contained therein. The water vapor may be removed by condensation (e.g. by cooling with a cooling liquid). As shown in FIG. 1, a flow of cooling water 300 into overhead condenser 290 causes condensation of steam in product stream 280, producing a 2-phase mixture, which flows into the condensate accumulator 310. The gaseous phase, which is water saturated $SO_2$ leaves as product stream 320. Some or all of the condensed water may be returned to the regeneration tower 20 as stream 330, where it flows downward through optional packed section 270. The cool condensate of stream 330 serves to wash volatilized absorbent from the vapors before they leave the tower 20 as product stream 280. This may help to reduce loss of absorbent chemical with the gaseous SO2 stream 320. It will be appreciated that additional treatment steps may be used to further limit the loss of absorbent from the process.

As noted above, hot lean absorbent stream 340 may be used to preheat $SO_2$ rich absorbent stream 80. However, it will be appreciated that stream 80 may be heated by other means, for example, by passing it through a reboiler (not shown) or heating stream 80 upon entry to tower 20 or any combination thereof. As shown in FIG. 1, $SO_2$ lean absorbent leaves regeneration tower 20 as stream 220 and enters the reboiler 230. The $SO_2$ lean absorbent may then leave the reboiler 230 by, e.g., overflowing a weir as heated lean adsorbent stream 340, which passes through the cross flow heat exchanger 90 to preheat stream 80. The SO2 lean absorbent leaves heat exchanger 90 as cooler lean absorbent stream 120, which may optionally be cooled further by a lean solvent trim cooler 350.

Optionally, the SO2 absorbent may be treated to remove heat stable salts (HSS) that may build up therein. As exemplified in FIG. 1, a slipstream 130 may be drawn from lean solvent trim cooler 350 and sent to a HSS removal unit (not shown) and stream 140, which comprises SO2 absorbent reduced in HSS from the HSS removal unit, joins the recycled cooled lean absorbent to form stream 70 (the $SO_2$ lean absorbent stream which is introduced into tower 30). HSS removal may be effected by any method known in the art, such as electrodialysis or ion exchange. In some embodiments, it may be desirable to employ ion pairing (or salt coupling). For example, a dual function resin having different ionic functional groups such as a combination of phenol and quaternary amine functional groups may be used or liquid-liquid extraction may be used. The stream 70 enters the absorption tower 30 for capturing $SO_2$ from the feed gas stream 10.

The process may be operated with any convenient pressure in the absorber 30. If the feed gas stream 10 is flue gas from a boiler, which usually is operated near atmospheric pressure, then tower 30 may be operated at atmospheric pressure or a bit below the pressure of feed gas stream 10 so as to favor the flow of feed gas stream 10 into tower 30. The regeneration tower 20 is often operated at a pressure slightly over atmospheric, generally not exceeding 3 bar absolute. An above-atmospheric pressure in the regenerator may help to strip SO2, due to the higher temperatures that can be achieved. Furthermore, the product $SO_2$ will be at a higher pressure, helping it to flow to a downstream unit without the aid of a fan or compressor.

EXAMPLES

The invention will now be illustrated by the following examples.

1. Test Apparatus and Methodology 1.1 Description of the Apparatus

A floor-scale pilot unit (hereinafter "pilot unit") was used for the testing of amine-based absorbents for removing $SO_2$ or carbon dioxide ($CO_2$) from a gas mixture. It is comprised of three columns: a pre-scrubber (to saturate and condition the gas at the desired temperature), an absorber and a regenerator. The unit is fully instrumented in order to record temperatures, gas and liquid flows, temperature profiles in the absorber and the regenerator, the effect of inter-cooling in the absorber, $CO_2$, $O_2$ and $SO_2$ concentration profiles throughout the absorber, as well as regeneration energy requirements.

The main control points are: gas temperature, lean amine temperature, lean amine introduction point in the absorber, rich amine temperature and pressure, rich amine introduction point in the stripper, intercooler temperature, and reboiler pressure and energy input.

1.2 Analytical Methods

The following methods and apparatus were used to characterize the solution's compositions: a Mettler-Toledo™ DL38 Karl Fisher Titrator was used to analyze water content, amine concentration was analysed using a Mettler-Toledo DL25 Titrator, salt analysis was done by ion chromatography using Dionex™ ICS-2000 Ion Chromatograph and accessories, Dionex IonPac AS15 4 mm×250 mm column, Guard column IonPac AG15, Dionex Cation column and IonPac CS-17 precolumn IonPac AG-17, and Dionex automated sampler AS 40, absorber-side SO2 concentration in the gas was measured using a Horiba™ VA3000 gas analyzer.

1.3 Optimization Procedure

The following testing protocol was used for the optimization and comparison of energy consumption: fix inlet gas flow rate, inlet gas pressure, inlet gas temperature, lean amine temperature to absorber, desorption unit pressure, rich amine temperature to regenerator.

Begin the optimization with the determination of the minimum liquid circulation with over stripping conditions (very lean solvent). This point is identified when $SO_2$ begins to slip through the absorber or where $SO_2$ recovery lowers from 100% recovery to 99% recovery. Typically, the minimization of liquid circulation rate should maximize amine loading and reduce desorption energy requirements.

Reduce the reboiler heat duty until $SO_2$ recovery drops below 98.5% recovery.

Increase and decrease liquid circulation by 10 to 15% to determine if there is an enhancement in SO2 recovery. If the recovery increases in either instance, it is then desired to reduce reboiler energy until 99% recovery is attained.

2. $SO_2$ Solubility in PEGDME $SO_2$ solubility in pure PEGDME is a function of its partial pressure in the gas. PEGDMEs that are commercially available from various manufacturers may be used in the invention. For gases having 100% vol $SO_2$ gas and 1.5% vol $SO_2$, $SO_2$ solubility in pure PEGDME fluctuated from 28.2 wt % to 0.53 wt % whereas $SO_2$ solubility in a solution having 50% water/50% PEGDME under the same SO2 partial pressure dropped to 8.5 wt % and 0.22 wt %, respectively. See Table 1.

TABLE 1

| SO₂ solubility versus PEGDME concentration Test temperature 50° C. | | | |
|---|---|---|---|
| Partial pressure SO2 | % Loading | 1.5 | 100 |
| 100% PEGDME | SO₂ wt % | 0.53 | 28.2 |
| 50% PEGDME in water | SO₂ wt % | 0.22 | 8.5 |
| 100% Water | SO₂ wt % | 0.15 | 3.9 |
| Solution A | SO₂ wt % | 8.1 | nd |

Based on the results in Table 1, it is estimated that the possible contribution of PEGDME to the loading capacity of Solution A, an aqueous solution comprising 25 wt % a mixture of Hep and DiHep and 1.2 equivalent/amine mole HSS, is about 2.6 wt %. It is noted that the SO2 loading capacity of a pure physical solvent may not be maintained when the physical solvent is mixed with another solvent.

3. Test 1

Table 2 shows molecular properties for each pure solvent used in the test, including heat of reaction with $SO_2$ ("Heat $R_x$ $SO_2$") and heat capacity ("Cp").

TABLE 2

Molecular properties

| Pure solvent/absor | Mw g/mol | Cp kJ/kg · K | Heat (Rx) SO2 kJ/mole | BP ° C. | Functional group |
|---|---|---|---|---|---|
| Water | 18 | 4.2 | 18* | 100 | hydrogen bound |
| TriEGMME | 164 | 2.19 | | 246 | hydroxyl/ether |
| PEGDME | 236 | 2.05 | 37-42§ | 275 | ether |
| TetraEG | 194 | 2.18 | | 315 | hydroxyl/ether |

*R. N. Goldberg and V. B. Parker, Thermodynamics of Solution of $SO_2$ (g) in Water and of Aqueous Sulfur Dioxide Solutions, National Bureau of Standards, Gaithersburg, MD 20899 Journal of Research of the National Bureau of Standards Volume 90, Number 5, September-October 1985

§Kurt A. G. Schmidt, Solubility of Sulphur Dioxide in Mixed Polyethylene Glycol Dimethyl Ethers, A thesis submitted to the faculty of graduate studies and research in partial fulfillment of the requirements for the degree of Master of Science in Chemical Engineering, University of Alberta, Fall 1997

Table 3 presents some of the solution properties. All the solutions formed one phase with the exception of the solution comprising 25 wt % of the mixture of Hep and DiHep and 15 wt % PEGDME.

Experimental heat capacity "(Cp)" of the solution comprising 25 wt % of the mixture of Hep and DiHep is 3.51 MJ/kg K. All the other Cp values were calculated. The Aspen model, a calibrated computational model, was able to validate the experimental Cp value with 2.8% difference and 1% difference for the calculated value of the solution comprising 25 wt % of the mixture of Hep and DiHep and 15 wt % PEGDME.

TABLE 3

Solution properties

| Mixture of Hep and DiHep wt % | polyol wt % | Viscosity (50° C.) Cst | Cp kJ/kg K | Cp (Aspen) kJ/kg K | Mw g/mole |
|---|---|---|---|---|---|
| 25 | 0 PEGDME | 1.8 | 3.51 | 3.41 | 168 |
| 25 | 5 | 2.4 | 3.4 | | 176.5 |
| 22 | 8 | 2.2 | 3.44 | | 182 |
| 18 | 14 | 2.1 | 3.42 | | 192 |
| 25 | 15 (2 phases) TetraEG | | 3.19 | 3.16 | 188 |
| 25 | 15 | 3.6 | 3.2 | | 176.9 |
| 25 | 25 TriEGMME | 9.3 | 3.00 | | 180.1 |
| 25 | 12 | 3.3 | 3.29 | | 166.7 |
| 18 | 23 | 3.4 | 3.26 | | 165.7 |

Tables 4 to 6 present several parameters from the tests done using the pilot unit at flow rates of 19, 25 and 30 g/min.

TABLE 4

Tests at 19 g/min

| Chemical Solvent Mixture of Hep and DiHep wt % | Physical Solvent Polyol | Lean Mole/mole | Lean % | Rich % | Delta % | Cp kJ/kg K | Regeneration MJ/kg SO2 | BP ° C. | Emission ppm SO2 | Energy Saving % |
|---|---|---|---|---|---|---|---|---|---|---|
| | Selexol wt % | | | | | | | | | |
| 25 | 0 | 0.15 | 1.66 | 5.89 | 4.23 | 3.5 | 9.9 | 112 | 141 | 0 |
| 25 | 5 | 0.09 | 1.26 | 5.53 | 4.27 | 3.4 | 9.9 | 114 | 100 | |
| 22 | 8 | 0.14 | 1.67 | 5.51 | 3.84 | 3.4 | 9.7 | 113 | 164 | |
| 18 | 14 | 0.06 | 0.75 | 4.64 | 3.89 | 3.4 | 9.7 | 113 | 68 | |
| 18 | 14 | 0.11 | 1.33 | 5.24 | 3.91 | 3.4 | 8.2 | 113 | 168 | ~17 |
| | TetraEG wt % | | | | | | | | | |
| 25 | 15 | 0.07 | 1.22 | 5.44 | 4.22 | 3 | 9.7 | 115 | 104 | |

TABLE 5

Tests at 25 g/min

| Physical solvent Polyol Selexol wt % | Chemical solvent Mixture of Hep and DiHep wt % | Lean mole/mole | Lean % | Rich % | Delta % | Cp kJ/kg K | Regeneration MJ/kg SO2 | BP ° C. | Emission Ppm SO2 | Energy saving % |
|---|---|---|---|---|---|---|---|---|---|---|
| 0 | 25 | 0.13 | 1.49 | 4.11 | 2.6 | 3.5 | 14.3 | 112 | 103 | 0 |
| 14 | 18 | 0.07 | 0.92 | 4 | 3.1 | 3.4 | 14.2 | 113 | 83 | |
| 14 | 18 | 0.08 | 1.33 | 4.2 | 2.9 | 3.4 | 11.9 | 113 | 98 | 17 |

TABLE 6

Tests at 30 g/min

| Chemical solvent Mixture of Hep and DiHep | Physical solvent Polyol | Lean mole/ mole | Lean % | Rich % | Delta % | Cp kJ/kg K | Regeneration MJ/kg SO2 | BP °C. | Emission Ppm SO2 | Energy saving % |
|---|---|---|---|---|---|---|---|---|---|---|
| 25 | 0 | 0.12 | 1.49 | 4.4 | 2.6 | 3.5 | 17.4 | 112 | 124 | 0 |
| 25 | 5 | 0.14 | 1.58 | 4.1 | 2.5 | 3.4 | 15.0 | 113 | 208 | |
| 22 | 8 | 0.12 | 1.55 | 4.3 | 2.7 | 3.4 | 14.6 | 113 | 179 | |
| 18 | 14 | 0.07 | 0.99 | 3.6 | 2.6 | 3.4 | 14.6 | 113 | 119 | 16 |
| | TetraEG wt % | | | | | | | | | |
| 25 | 15 | 0.11 | 1.29 | 4 | 2.7 | 3.2 | 14.6 | 115 | 137 | 16 |
| 25 | 25 | 0.08 | 0.93 | 3.6 | 2.6 | 3 | 17.2 | 117 | 99 | 0 |

For the test done at 30 g/min (Table 5), solutions containing PEGDME, with similar Cp, boiling points, and similar regeneration energies, showed a decrease in SO2 emission from 208 to 119 ppm as the amount of PEGDME increased from 5% to 14% in the solution.

Figure 2:
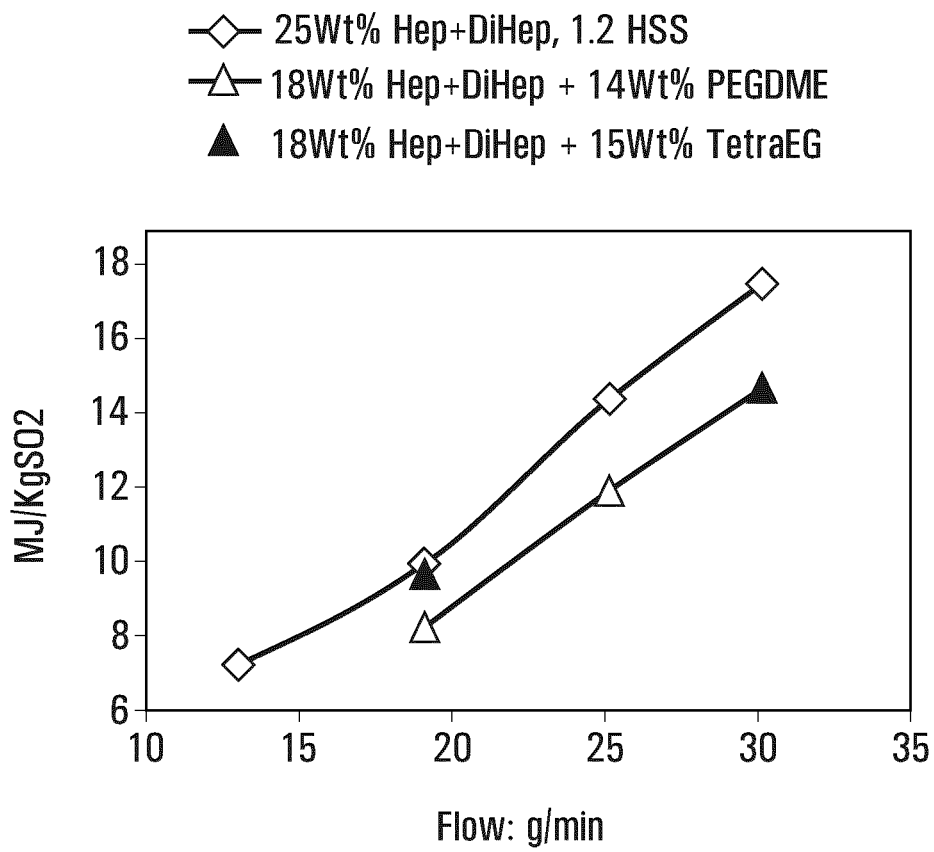
FIG. 2 shows regeneration energy consumptions of hybrid solvents and an amine-based solvent according to an embodiment of the invention.

Each solution tested comprising a mixture of chemical and physical solvents, except the solution comprising 25 wt % of the mixture of Hep and DiHep and 5 wt % PEGDME, provided a reduction in regeneration energy consumption compared to the bench mark solution. The results of the solution comprising 25 wt % of the mixture of Hep and DiHep, the solution comprising 18 wt % of the mixture of Hep and DiHep and 14 wt % PEGDME, and the solution comprising 18 wt % of the mixture of Hep and DiHep and 15 wt % TetraEG shown in Tables 4 to 6 are also represented as FIG. 2.

4. PEGDME Solubility Versus Amine and Salts Levels

Table 7 shows the relationship between the level of HSS and PEGDME solubility when the amine concentration is the same: for the solution having 13 wt % the mixture of Hep and DiHep, the level of miscible PEGDME was 22 wt % at 1 equivalent/amine mole HSS versus 17 wt % at 1.2 equivalent/amine mole HSS. Table 7 also shows that for the same level of HSS, the amine concentration also influences the miscibility of PEGDME to maintain a one-phase solution: for the solution containing 25 wt % the mixture of Hep and DiHep to maintain a one-phase solution, the maximum concentration of PEGDME was 5 wt %; whereas when the concentration of the mixture of Hep and DiHep was at 13 wt %, the maximum concentration of PEGDME rose to 17 wt %.

TABLE 7

PEGDME solubility in the mixture of Hep and DiHep

| Mixture of Hep and DiHep wt % | HSS equi/mole | PEGDME wt % |
|---|---|---|
| 13 | 1 | 22 |
| 13 | 1.2 | 17 |
| 18 | 1.2 | 14 |
| 22 | 1.2 | 8 |
| 25 | 1.2 | 5 |

A polyol like TetraEG did not show solubility limitation versus amine concentration and TriEGMME showed intermediate solubility. Without being limited by theory, it is believed that hydroxyl groups may confer better solubility than methyl groups.

5. Test 2
5.1 Tested Solutions

The following solutions were tested:

Solution A, the benchmark solution, which is an aqueous solution comprising 25 wt % the mixture of Hep and DiHep and 1.2 equivalent/amine mole HSS;

Solution A-Org, which is an aqueous solution comprising 25 wt % the mixture of Hep and DiHep, 20 wt % malic acid, and 6 wt % NaOH;

Solution DABCO, which is an aqueous solution comprising 25 wt % DABCO and 1.0 equivalent/amine mole HSS;

Solution B, which is an aqueous solution comprising 18 wt % the mixture of Hep and DiHep, 14 wt % PEGDME, and 1.2 equivalent/amine mole HSS;

Solution C, which is an aqueous solution comprising 25 wt % Amide-DiHep, 20 wt % PEGDME, and 0.4 equivalent/amine mole HSS;

Solution D, which is an aqueous solution comprising 22 wt % 3-aminopyrazole, 32 wt % PEGDME, and 0.1 equivalent/amine mole HSS;

Solution A-TriEGMME, which is an aqueous solution comprising 25 wt % the mixture of Hep and DiHep, 12 wt % TriEGMME, and 1.2 equivalent/amine mole HSS; and Solution A-TetraEG, which is an aqueous solution comprising 25 wt % the mixture of Hep and DiHep, 15 wt % TetraEG, and 1.2 equivalent/amine mole HSS.

A compilation of molecular structure diagrams of the chemicals used in the various solutions described above is as follows.

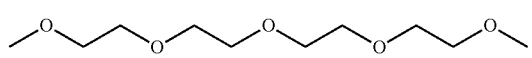

Polyethyleneglycol dimethylether (PEGDME)

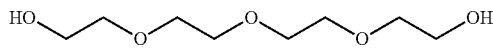 [SMILES: OCCOCCOCCOCCO]

Tetraethylene glycol (TetraEG)

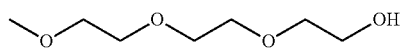

Triethyleneglycol monomethylether (TriEGMME)

Malic acid

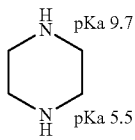

Piperazine

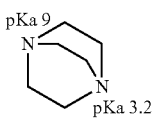

DABCO

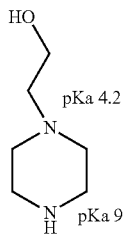

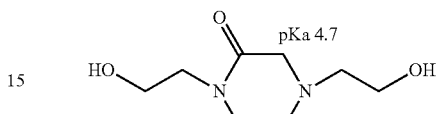

4-[hydroxyethyl]piperazine (Hep)

2-piperazinone 1,4-bis[2-hydroxyethyl] (Amide-DiHep)

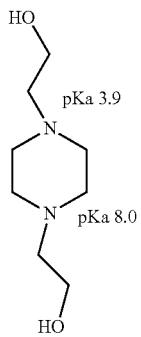

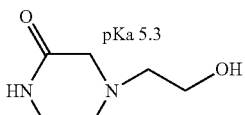

2-piperazinone 4-(2-hydroxyethyl) (Amide-Hep)

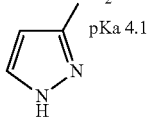

3-aminopyrazole

5.2 Molecular Properties of Pure Solvents

Pure $SO_2$ absorbents were initially ranked on the basis of their physical properties. Criteria included a low vapor pressure to minimize losses and a $pK_a$ within the range of 3.5 to 4.7 for selective $SO_2$ removal. As shown in Table 9, with the exception of DABCO and Amide-HEP, all pure $SO_2$ absorbents have a vapor pressure of less than 0.01 mmHg and pKa in the range of 3.2 to 4.7. In commercial application, the DABCO amine is acidified to 1 equivalent resulting in a considerably suppressed vapor pressure.

1,4-bis[hydroxyethyl]piperazine (DiHep)

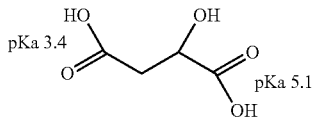

TABLE 8

Molecular properties

| Amine and solvent/Property | Amide-Hep | Amide-DiHep | 3-amino pyrazole | DABCO | PEGDME | TetraEG | TriEG MME |
|---|---|---|---|---|---|---|---|
| Molecular Weight | 144 | 188 | 83 | 112 | Mn~236 | 194 | 164 |
| Density at 20° C., g/cc | 1.152 | 0.9300 | — | 1.02 | 1.2650 | 1.125 | 1.026 |
| Boiling Point, ° C. | 374 | 409 | 290 | 174 | >250 | 314 | 250 |
| Vapor Pressure at 20° C., mm Hg | <0.01 | <0.01 | — | 2.9 (50° C.) | <0.01 | <0.01 | <0.01 |

TABLE 8-continued

Molecular properties

| Amine and solvent/ Property | Amide- Hep | Amide- DiHep | 3-amino pyrazole | DABCO | PEGDME | TetraEG | TriEG MME |
|---|---|---|---|---|---|---|---|
| Freezing or Melting Point, °C. | — | — | — | — | — | — | — |
| pKa at 25° C. | 5.3 | 4.7 | 4.1 | 3.2 | — | — | — |

5.3 Blending Ratios

A relation between the salts level and the maximum concentration of miscible PEGDME in solution was shown in Table 10. When the concentration of PEGDME exceeds the maximum amount, phase separation may occur. Solutions 1 and 2 having increased HSS level from 1 to 1.2 eq./mole showed corresponding decrease in the maximum concentration of miscible PEGDME from 22 to 17 wt %. The salt effect is more pronounced with solutions 5, 6, and 7 where a decrease in the salt level from 1.2 to 0.1 eq./mole corresponded with an increase of the maximum concentration of miscible PEGDME from 5 to 32 wt %. Solutions 3 to 5 having increased amine concentrations and a constant salt level showed corresponding decrease in the PEGDME concentration from 14 to 8 wt %.

TABLE 9

Maximum miscible PEGDME concentration in solution as a function of amine concentration and HSS level

| Solution # | Amine Type | Amine wt % | HSS Eq/mole | PEGDME wt % |
|---|---|---|---|---|
| 1 | Mixture of Hep and DiHep | 13 | 1 | 22 |
| 2 | Mixture of Hep and DiHep | 13 | 1.2 | 17 |
| 3 | Mixture of Hep and DiHep | 18 | 1.2 | 14 |
| 4 | Mixture of Hep and DiHep | 22 | 1.2 | 8 |
| 5 | Mixture of Hep and DiHep | 25 | 1.2 | 5 |
| 6 | Amide-DiHep | 25 | 0.4 | 20 |
| 7 | Aminopyrazole | 22 | 0.1 | 32 |

5.4 Physical Properties of the Solutions

Solutions A-Org, B and C were shown to have densities that are comparable to that of Solution A. Solutions A-Org and B were shown to have viscosities that are comparable to that of Solution A.

5.5 Foam Tendency and Surface Tension

Methods for performing foam measurements are described in the literature. See, for example, ASTM D1881, "Standard Test Method for Foaming Tendencies of Engine Coolants in Glassware" and ASTM D892, "Standard Test Method for Foaming Characteristics of Lubricating Oils", both of which are available from ASTM International, 100 Barr HarborDrive, PC Box C700, West Conshohocken, Pa. 19428-2959 USA and are incorporated herein in their entirety.

For the present invention, samples were sparged with 1000 ml/min of nitrogen or air flowed through a diffuser stone (available from ASTM International, VWR International and Fisher Scientific). The height of the foam produced after one minute (±1 second) was measured. After the gas flow was stopped, the time required for the foam to collapse was recorded. The results are shown in Table 10.

The target was a foam height of less than 150 ml and a break time of less than 15 seconds. Pure PEGDME did not foam. The mixture of PEGDME in water was measured to have a foam height of 250 ml and a break time of 18 seconds. Solutions B and C showed foaming tendency with more than 360 ml of foam and more than 58 seconds break time. Foaming was mitigated with the addition of an anti-foam agent such as DOW's Ucarsol™ GT-10 Antifoam (silicone based). Adding 50 to 150 ppm of an anti-foam agent in solution was shown to reduce the foaming height to below 100 ml with 8 seconds break time. Alternative anti-foam agents are available and could also be used, subject to compatability with the process. For the surface tension, Solution A had a value of 45 Dyne/cm, pure PEGDME had a value of 36 Dyne/cm and Solution B had a value of 39 Dynes/cm.

TABLE 10

Foaming Tendency and Surface Tension (N2 Flow Rate 1 L/minute)

| Solution | | Foam Height (mL) | Foam Breakdown (sec) | Surface Tension Dyne/cm (at 22° C.) |
|---|---|---|---|---|
| A | | 50 | 4 | 45 |
| B | | 360 | 58 | 39 |
| | With 50 ppm GT-10 antifoam | 100 | 8 | |
| C | | 370 | 80 | nd |
| | With 150 ppm GT-10 antifoam | 45 | 8 | |
| PEGDME (100%) | | 0 | 0 | 36 |
| PEGDME (25% in water) | | 250 | 18 | |

5.6 Operating Conditions

The pilot unit was standardized for a SO2 process with Solution A at 13, 19 and 25 g/min. Table 11 presents the process inputs and recorded performances of Solution A, the bench mark solution. The target shall be 100 ppmv (+/−30 ppmv) SO2 emissions in all cases. The other tested solutions were run at 13, 19 and 25 g/min at the same operating conditions presented in Table 11.

TABLE 11

| Conditions of Test 2 | | | | |
|---|---|---|---|---|
| Feed gas SO2 | wt % | 1.5 | 1.5 | 1.5 |
| Feed gasCO2 | wt % | na | na | na |
| Flow N2 | SL/min | 17.33 | 17.33 | 17.33 |
| Flow SO2 | SL/min | 0.26 | 0.26 | 0.26 |
| Flow CO2 | SL/min | na | na | na |
| Absorption packing section | inches | 52 | 52 | 52 |
| Stripper packing section | inches | 26 | 26 | 26 |
| MW | g/mole | 168 | 168 | 168 |
| FI-08 Flow | g/min | 13 | 19 | 25 |
| Pi-11 Pressure | psig | 8 | 8 | 8 |
| Regen outlet Te-03 Gas inlet | ° C. | 32 | 31 | 33 |
| Te-13 Rich line heating tape | ° C. | 95 | 95 | 95 |
| Energy input | % | 25.5 | 29.5 | 34.5 |
| Key Performance Indicators | | | | |
| Average striping factor | MJ/Kg | 7.77 | 11.0 | 14.55 |
| Lean loading | mole/mole | 0.19 | 0.13 | 0.12 |
| Delta loading | mole/mole | 0.59 | 0.39 | 0.29 |
| Lean pH | pH | 5.1 | 5.3 | 53 |
| Rich pH | pH | na | na | na |
| SO$_2$ gas emission (Horiba) | ppmv | 130 | 108 | 112 |
| Removal | % | 99 | 99 | 99 |

5.7 Emission Level

Figure 3:
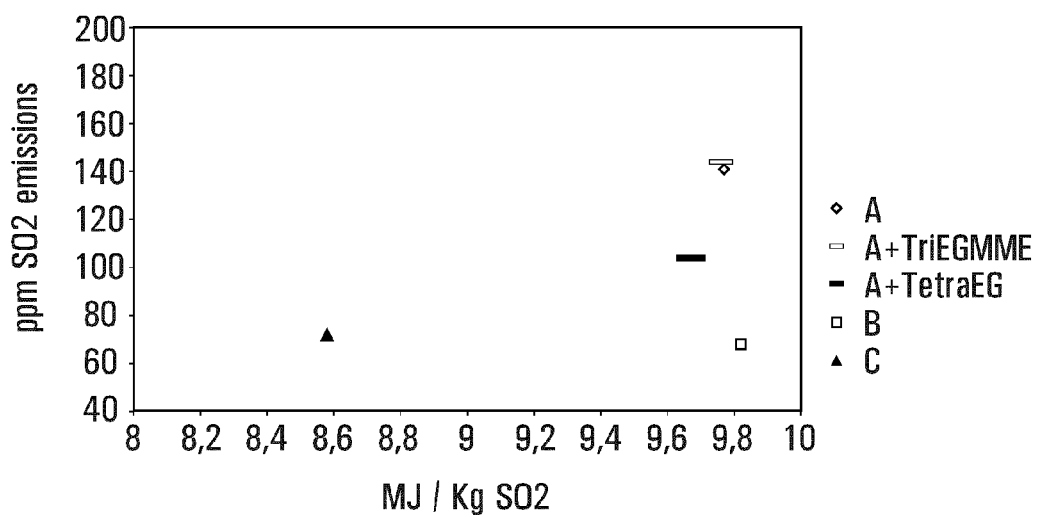
FIG. 3 shows $SO_2$ emission levels of the different tested solutions in Example 5 (Test 2) (tested at 1.5% pp SO2 and liquid/gas ratio (L/G) of 0.98 L/Nm$^3$).

Among Solutions A, A-TriEGMME, A-TetraEG and B which have the same amine absorbent, Solution B demonstrated the lowest SO$_2$ emission under similar L/G (0.96 to 0.99 L/Nm3) and similar energy (9.7 to 9.8 MJ/kg SO$_2$). Solution C with an increased amount of PEGDME and a lower level of HSS demonstrated lower regeneration energy consumption compared to Solution A. See FIG. 3.

5.8 Solvent Capacity

Figure 4:
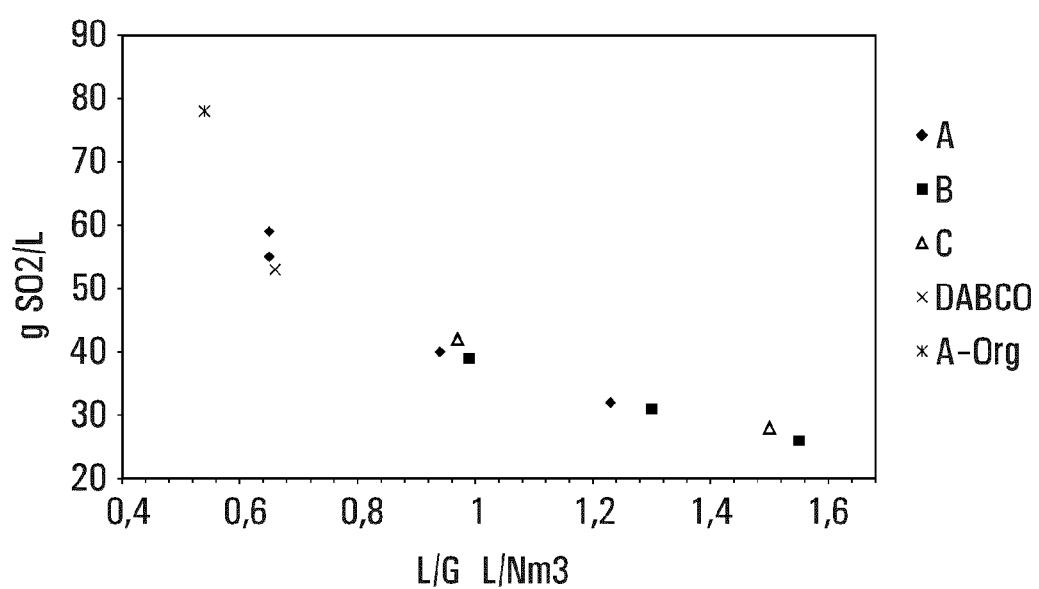
FIG. 4 shows $SO_2$ delta loading in solution vs. liquid/gas ratio in absorber of the various tested solutions in Example 5 (Test 2).

The different solutions tested showed similar capacities for the range of L/G ratios tested. Solution A-Org had the highest capacity which may be due to more active sites for SO2 scrubbing. All the others solutions with or without polyol showed very similar capacities (FIG. 4). The presence of PEGDME from 14 to 22 wt % in the solution seems to have low impact on the capacity of the solution.

5.9 Regeneration Energy

Figure 5:
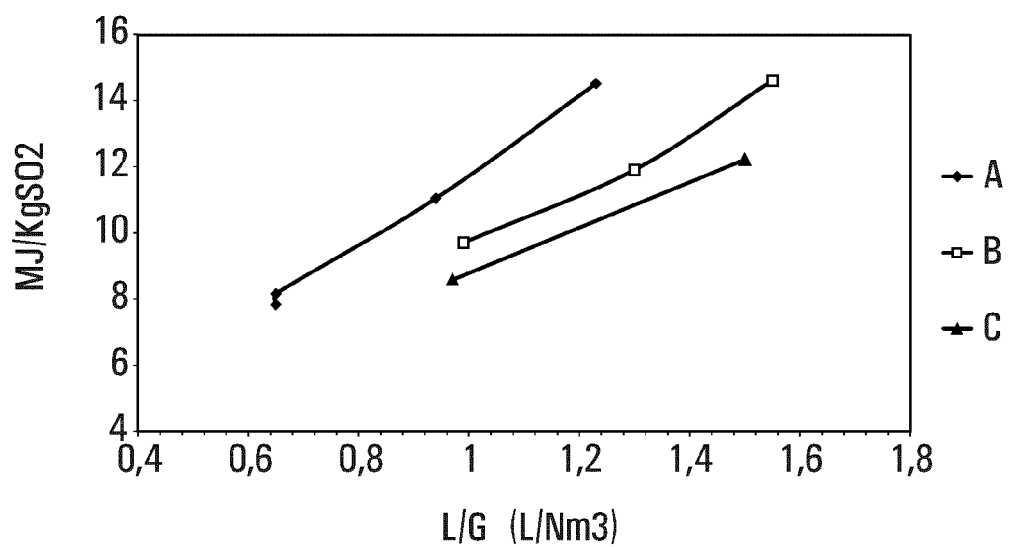
FIG. 5 shows regeneration energy consumptions of Solutions A, B and C in Example 5 (Test 2) (tested at 1.5% pp $SO_2$).

Solution A, Solution B (14 wt % PEGDME) and Solution C (20 wt % PEGDME) were tested under similar test conditions presented in Table 11. Solutions B and C demonstrated 15 and 22% reduction of regeneration energy respectively over Solution A (FIG. 5).

5.10 Amine Purification Unit (APU)

For Solution B, HSS removal tests were performed using a commercially available standard ion resin. As expected, due to its lower HSS amount, Solution B displayed a slower rate (by 21%) of sulfate removal than the bench mark solution. This is relevant to the APU bed volume, for instance, assuming the same generation rate of HSS, the APU bed volume will have to be larger (e.g., 21% larger).

Table 12 shows consumption results for a standard ion exchange against liquid-liquid (L/L) extraction on a per kilogram of sulfate removed. The water consumption per kilogram of sulfate was 30 times less for liquid-liquid extraction, and similarly 20 times less for the waste generated, compared to when the standard ion exchange was used. Amine loss per kilogram of sulfate was reduced by a factor of 10 for liquid-liquid extraction compared to the standard ion exchange.

TABLE 12

| Comparison of anionic resin and ion pairing principle | | | |
|---|---|---|---|
| 100% base | Unit | IX Anionic resin | L/L extraction Ion pairing |
| Amine | kg/kg sulfate | 0.02 | 0.002 |
| Water | kg/kg sulfate | 1116 | 35 |
| Waste generated | kg/kg sulfate | 751 | 39 |

6. Test 3

Figure 6:
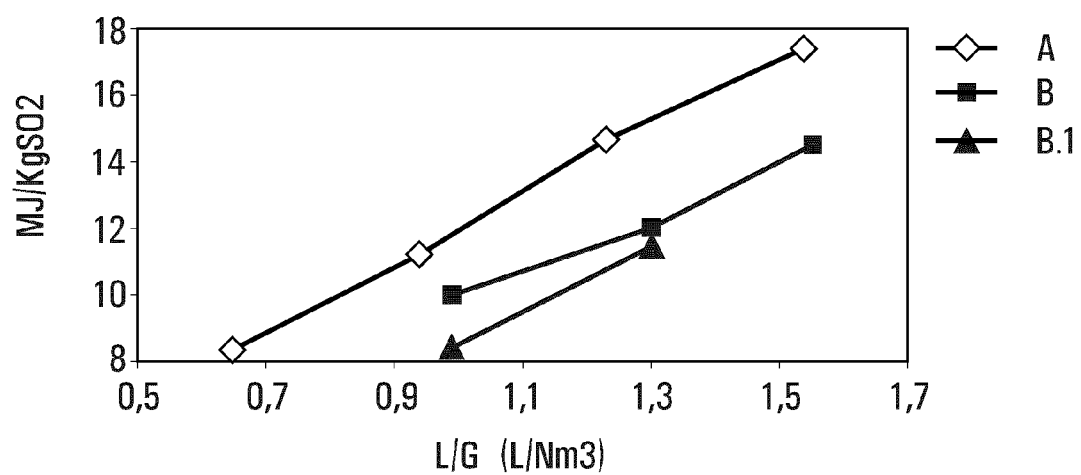
FIG. 6 shows regeneration energy consumptions of Solutions B and B.1 in Example 6 (Test 3).

Solution B.1 which is an aqueous solution comprising 13 wt % the mixture of Hep and DiHep, 17 wt % PEGDME, and 1.2 equivalent/amine mole HSS was tested. FIG. 6 shows that Solution B.1 was able to reduce regeneration energy consumption more than Solution B did at two L/G (L/Nm3) tested.

It should be understood that where a range is disclosed herein, any range or specific value falling within the broader range is intended to be encompassed as if it was specifically disclosed.

Any patent, publication or other reference in incorporated herein in its entirety.

Although the foregoing invention has been described in some detail by way of illustrations and examples for purposes of clarity of understanding, the scope of the invention is not limited to the examples described herein and should be given a broad interpretation consistent with the specification as a whole, including the claims.

7. Test 4

A benchmark solution was prepared. It was an aqueous solution comprising 25 wt % of a mixture of Hep and DiHep, 1.2 equivalent/amine mole HSS.

A test solution D was prepared comprising 13 wt % of a mixture of Hep and DiHep, 1.1 equivalent/amine mole HSS, 20 wt % PEGME, and its pH was adjusted in the range of between 5.2 and 5.6 using sulphuric acid.

Each solutions was used to absorb sulphur dioxide from a feed gas (step (i)). Then each solution was subjected to stream stripping (step (ii)), and the regenerated aqueous absorbing medium was recycled.

With each solution an SO2 stream was obtained. And the off-gas comprised a low amount of SO2. Each process was set at an SO2 emission level of 100 ppm, and then at an SO2 emission level of 60 ppm.

Neither the benchmark solution nor solution D showed liquid-liquid phase separation during step (i) or step (ii).

Solution D showed 28% decrease in energy consumption as compared to the benchmark solution. This was the case for the process with an SO2 emission level of 100 ppm as well as for the process with an SO2 emission level of 60 ppm.

8. Test 5

The test solution D was prepared comprising 13 wt % of a mixture of Hep and DiHep, 1.1 equivalent/amine mole HSS, 20 wt % PEGME, and its pH was adjusted in the range of between 5.2 and 5.6 using sulphuric acid.

A test solution E was prepared. It was an aqueous solution comprising 25 wt % of a mixture of Hep and DiHep, 1.2 equivalent/amine mole HSS, and 25 wt % PEGME.

Each solutions was used to absorb sulphur dioxide from a feed gas (step (i)). Then each solution was subjected to stream stripping (step (ii)), and the regenerated aqueous absorbing medium was recycled.

Test solution E showed liquid-liquid phase separation during step (i) as well as during step (ii). Solution D did not show liquid-liquid phase separation during step (i) or step (ii). For each test all absorbing medium was passed from step (i) to step (ii).

Solution D showed 28% decrease in energy consumption as compared to solution E.

That which is claimed is:

1. A process for removing sulfur dioxide from a feed gas stream, which process comprises:
    (i) contacting the feed gas stream with an aqueous lean absorbing medium to absorb sulfur dioxide and to form a sulfur dioxide lean treated gas stream and a spent absorbing medium;
    wherein the aqueous lean absorbing medium comprises:
        (a) a chemical solvent comprising a regenerable absorbent,
        (b) a physical solvent, and
        (c) one or more heat stable salts;
    wherein the regenerable absorbent is an amine;
    wherein the ratio of the weight percentage of the physical solvent in the lean absorbing medium over that of the regenerable absorbent is in the range of from 0.5 to 2.5;
    wherein the ratio of the weight percentage of heat stable salts in the lean absorbing medium over that of the regenerable absorbent is in the range of from 0.29 to 0.37; and
    wherein the pH of the lean absorbing medium is 6 or less.

2. The process according to claim 1, wherein the process further comprises:
    (ii) stripping, absorbed sulfur dioxide from the spent absorbing medium to produce a regenerated aqueous absorbing medium and a gaseous sulfur dioxide;
    and optionally
    (iii) recycling the regenerated aqueous absorbing medium from step (ii) to step (i).

3. The process according to claim 1, wherein the absorbing medium is present in a single liquid phase during step (i).

4. The process according to claim 2, wherein the absorbing medium is present in a single liquid phase during step (ii).

5. The process according to claim 2, wherein step (ii) is performed in a reboiler,
    forced circulation reboiler, fired reboiler, falling film reboiler, direct steam reboiler, or thermosyphon.

6. The process according to claim 2, wherein at least 97 vol % of the spent absorbing medium formed in step (i) is stripped in step (ii).

7. The process according to claim 1, wherein the regenerable absorbent is a diamine or polyamine which in half salt form has a $pK_a$ value for the free nitrogen atom of 3.0 to 5.5, preferably 3.5 to 4.7, at a temperature of 20° C. in an aqueous medium.

8. The process according to claim 1, wherein the regenerable absorbent is a diamine represented by the formula:

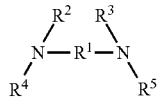

wherein $R^1$ is an alkylene of two or three carbon atoms as a straight chain or as a branched chain, $R^2$, $R^3$, $R^4$, and $R^5$ may be the same or different and can be hydrogen, alkyl, hydroxyalkyl, aralkyl, aryl, or alkaryl, and any of $R^2$, $R^3$, $R^4$, and $R^5$ may form cyclic structures.

9. The process according to claim 1, wherein the regenerable absorbent is a tertiary amine represented by the formula:

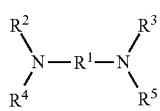

wherein $R^1$ is an alkylene of two or three carbon atoms as a straight chain or as a branched chain, and $R^2$, $R^3$, $R^4$, and $R^5$ can be alkyl, hydroxyalkyl, aralkyl, aryl, or alkaryl, and any of $R^2$, $R^3$, $R^4$, and $R^5$ may form cyclic structures.

10. The process according to claim 1, wherein the regenerable absorbent is piperazine, hydroxyethyl piperazine, bis-hydroxyethyl piperazine, hydroxyethylethylenediamine, bis-hydroxyethylethylenediamine, 1,4-diazabicyclo[2.2.2]octane (DABCO), 2-[2-aminoethyl]pyridine, 2-aminomethylpyridine, 3-amino 5-methylpyrazole, 3-aminopyrazole, 3-methylpyrazole, N,N,N',N'-tetraethyldiethylenetriamine, N,N,N',N'-tetramethyldiethylenetriamine, 2-piperazinone 1,4-bis[2-hydroxyethyl], or a combination thereof.

11. The process according to claim 1, wherein the lean absorbing medium additionally comprises an organic acid and/or an anorganic acid.

12. The method according to claim 1, wherein the physical solvent has a vapour pressure less than 0.1 mmHg at 20° C. with a boiling point equal to or higher than 240° C.

13. The process according to claim 1, wherein the physical solvent is a polyol, a polycarbonate, an N-formyl morpholine, or a combination thereof.

14. The process according to claim 1, wherein the physical solvent is polyethyleneglycol dimethylether (PEGDME), tetraethyleneglycol dimethylether (TetraEGDME), tetraethylene glycol (TetraEG), triethyleneglycol monomethylether (TriEGMME), or a combination thereof.

15. The process according to claim 1, wherein the physical solvent is polyethyleneglycol dimethylether (PEGDME), and
    wherein the regenerable absorbent is
    4-[hydroxyethyl]piperazine (Hep), or
    1,4-bis[hydroxyethyl]piperazine (DiHep), or
    3-aminopyrazole, or
    a mixture of 4-[hydroxyethyl]piperazine (Hep) and 1,4-bis[hydroxyethyl]piperazine (DiHep).

* * * * *